United States Patent [19]

Losco et al.

[11] 3,903,129

[45] Sept. 2, 1975

[54] CATALYTIC PROCESS FOR THE PREPARATION OF THIOCARBAMIC ACID ESTERS

[75] Inventors: Giuseppe Losco, Milan; Antonio Quattrini, Garessio Borgo Ponte, both of Italy

[73] Assignee: Montecatini Edison S.p.A., Milan, Italy

[22] Filed: Dec. 6, 1973

[21] Appl. No.: 422,552

[30] Foreign Application Priority Data

Dec. 6, 1972 Italy............................... 32570/72

[52] U.S. Cl............................................. 260/455 A
[51] Int. Cl.² ..................................... C07C 155/02
[58] Field of Search .............................. 260/455 A

[56] References Cited

UNITED STATES PATENTS

| | | | |
|---|---|---|---|
| 2,913,325 | 11/1959 | Tilles | 260/455 A |
| 2,913,326 | 11/1959 | Tilles | 260/455 A |
| 2,913,328 | 11/1959 | Tilles | 260/455 A |
| 2,983,747 | 5/1961 | Campbell et al. | 260/455 |

*Primary Examiner*—Lewis Gotts
*Assistant Examiner*—D. R. Phillips

[57] ABSTRACT

Esters of thiol-carbamic acids are produced by reacting a carbamoyl chloride with a mercaptan in the presence of catalytic quantities of Zn, Sn and Fe or of a metal alloy such as a DeVarda alloy.

The esters of thiol-carbamic acids have a variety of uses including use as herbicides.

6 Claims, No Drawings

CATALYTIC PROCESS FOR THE PREPARATION OF THIOCARBAMIC ACID ESTERS

THE PRIOR ART

Various difficulties are encountered in the production of esters of thiol-carbamic acids, particularly when they are produced for use as pesticides which must have, in general, a purity titer not lower than 95%.

The processes heretofore known for the synthesis of the thiolcarbamates lead to products which do not have a sufficiently high titer without burdensome purification operations involving crystallization or fractional distillation, with considerable reduction in total reaction yields.

Thus, for instance, in the case S-benzyl-disecbutyl-thiolcarbamate, S-benzyl-disecbutyl-thiolcarbamate a herbicidal ester disclosed in Italian Patent No. 907,710, it is found that by condensing alkaline benzylmercaptan with disecbutylcarbamoyl chloride, there is obtained, after elimination of the solvent in which the reaction takes place, a product having a titer comprised between 90 and 91%. In order to raise the titer to the required value of 95% or higher, it is necessary to subject the condensation product to fractional distillation which, on a commercial scale, involves a loss of about 20%.

It is also known (see U.S. Pat. No. 2,983,747) to prepare thiol-carbamates having herbicidal properties by reacting a carbamoyl chloride with a mercaptan, in the presence of $ZnCl_2$ as catalyst. However, independently of the conditions under which the reaction is carried out, that process presents serious problems arising from the impurities present in the intermediate mercaptan which, as is known, always contains a greater or lesser quantity of disulphide. Purification of the mercaptan to remove the disulphide is not desirable in practice because of the increase in cost of the mercaptan such removal entails.

THE PRESENT INVENTION

An object of this invention is to provide a new process for preparing esters of thiol-carbamic acids which is free of the disadvantages of the processes known heretofore.

This and other objects are accomplished by the present invention, in accordance with which useful esters of the thiol-carbamic acids are produced in practically quantitative yield by reacting a carbamoyl chloride with a mercaptan in the presence of a catalyst which is one of the metals Zn, Sn or Fe, or a metal alloy such as a DeVarda alloy.

The reaction may be represented as follows:

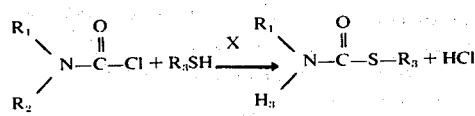

In the formulae given, $R_1$ and $R_2$, which may be the same or different, represent linear, branched or cyclic saturated or unsaturated aliphatic radicals having from 1 to 9 carbon atoms; aromatic radicals; or are joined to each other to form, with N, a polycyclomethylene ring; $R_3$ is a linear, branched or cyclic aliphatic radical having from 1 to 9 carbon atoms or an aromatic radical, e.g., the benzyl radical; X is the catalyst and is Zn, Sn or Fe or a metal alloy such as a DeVarda alloy.

Typical carbamoyl chlorides which can be used in the process of the invention include disecbutylcarbamoyl chloride, diethylcarbamoyl chloride, hexamethylene-iminocarbamoyl chloride, N,N-di-n-butyl carbamoyl chloride, N,N-diisopropylcarbamoyl chloride, diallylcarbamoyl chloride, etc.

Suitable mercaptans, include benzyl mercaptan, ethyl mercapatan, p-chlorobenzyl mercaptan, etc.

The reaction may be carried out in a solvent or in the absence of solvents, but preferably is carried out in the absence of solvents to avoid the problems of solvent recovery.

Low or relatively low reaction temperatures are generally used, comprised between 20° and 120°C; the reaction proceeds at room pressure.

The quantity of catalyst used is not critical and influences only the rate of the reaction.

In practice, satisfactory reaction rates are obtained when the amount of catalyst used is, in general, not less than 4 g/mole of the carbamoyl chloride. Preferably, the catalyst is used in an amount of from 4 to 15 g/moles of the carbamoyl chloride.

We have found that mercaptans containing considerable amounts of disulphide can be used in the process of this invention without any reduction in the titer of the final thiol-carbamate and that the yield of useful product obtained is practically quantitative.

The unexpected technical improvement which is achieved by the present process is evidenced by the higher titer in thiol-carbamate after simple solvent evaporation and which eliminates the need to subject the raw reaction product to purification treatments. This, plus the fact that starting mercaptans containing substantial amounts of disulphide may be used without presenting the problems of the prior art, makes the present process exceptionally well-suited to the production of thiol-carbamates useful as herbicides and pesticides on a commercial scale.

The titers of the thiol-carbamates obtained by the present process, and which are values that meet the requirements of herbicides and pesticides, were determined by gas-chromatographic or TLC techniques.

The following examples are given to illustrate the invention and are not intended to be limiting.

EXAMPLE 1

To 24.8 g (0.2 moles) of benzyl mercaptan and 1 g of Zn powder, under stirring at 50°–60°C, were added during 30 minutes 38.2 g (0.2 moles) of disecbutylcarbamoyl chloride. The reaction was exothermic with development of HCl and $H_2$. The addition having been accomplished, the reaction mass was heated to 55°–60°C for 1 hour, and then, after cooling down, the product was washed with water until neutrality was reached.

The separated organic phase was dried by heating it to 80°C under reduced pressure. Thereby were obtained 55 g of an oily liquid consisting of S-benzyl-N,N-disecbutyl-thiol-carbamate having a titer of 98% and equal to a reaction yield of 96.6% of the same ester having a titer of 100%.

EXAMPLE 2

To a solution of 24.8 g (0.2 moles) of benzylmercaptan in 100 cc of benzene, was admixed 1 g of Zn powder. This mass was heated, under stirring, to 50°–55°C, and thereupon, in about 30 minutes, 38.2 g (0.2 moles) of disecbutylcarbamoyl chloride were added dropwise.

An exothermic reaction took place with the development of HCl and $H_2$. After the addition had been completed, the mass was heated to 55°–60°C for 1 hour and, after cooling down, 100 cc of water were added. Thereupon the benzenic phase was collected and, after further washing with water until neutrality was attained, it was concentrated in a water bath at 80°C, under reduced pressure (about 15 mm Hg), until the solvent was completely eliminated. Thereby were obtained 56 g of an oily liquid consisting of S-benzyl-N,N-disecbutyl-thiolcarbamate having a titer of 97% corresponding to a reaction yield of 97% in 100% product.

EXAMPLE 3

To a mixture of 24.8 g (0.2 moles) of benzylmercaptan, containing 5% of dibenzyl disulphide as impurity, 3 grams of iron powder, and 100 cc benzene, there were admixed, under stirring, 38.2 g (0.2 moles) of disecbutylcarbamoyl chloride. The mixture was refluxed for 2 hours and 30 minutes.

By operating as indicated in Example 2, there were obtained 53.8 g of an oily liquid consisting of S-benzyl-N,N-disecbutyl-thiol-carbamate having a titer of 95.5% which corresponded to a reaction yield of 92% of product at 100%.

EXAMPLE 4

To a mixture of 24.8 g (0.2 moles) of benzylmercaptan containing 5% of dibenzyl disulphide, 3 g of tin powder, and 100 cc benzene, there were admixed, under stirring, 38.2 g (0.2 moles) of disecbutylcarbamoyl chloride. The mass was then reflux-heated for 2 hours and 30 minutes, operating as in Example 2, and thereby obtaining 52 g of an oily liquid consisting of S-benzyl-N,N-disecbutyl-thiol-carbamate having a titer of 97.5% corresponding to a reaction yield of 91% in 100% product.

EXAMPLE 5

Example 4 was repeated, except that 2 g of a DeVarda alloy were used as the catalyst. S-benzyl-N,N-disecbutyl-thiol-carbamate having a titer of 96.3% corresponding to a reaction yield of 91% in a 100% product was obtained.

COMPARATIVE EXAMPLE 5a

Operating according to Italian Patent No. 907,710, 1000 cc of benzene, 205 g of benzylmercaptan (1.65 moles) and 66 g (1.65 moles) of NaOH dissolved in 50 cc of water, were introduced into a 3-liter flask fitted with a stirrer, a thermometer, reflux coolant and a device for azeotropic distillation.

The reaction mass was then brought to the boiling point under stirring and all of the water was eliminated azeotropically. Thereupon, 316 g of disecbutylcarbamoyl chloride (1.65 moles) were introduced into the reactor and the whole was reflux-heated for 4 hours under stirring. After cooling the mass down to 20°C, 1000 cc of water were added and the two liquid phases stratified.

The benzenic phase was washed twice with 5000 cc of water each time, and then concentrated in a water bath at 80°C, under reduced pressure, until complete elimination of the solvent. Thereby were obtained 451 g of an oily liquid consisting of 91% of S-benzyl-N,N-disecbutyl-thiolcarbamate corresponding to a reaction yield of 89% in 100% product.

EXAMPLE 6

To a mixture of 31.6 g (0.2 moles) of p-chlorobenzylmercaptan, 8.5 g of Zn powder, 100 cc benzene, were admixed under stirring at 70°–75°C, 27 g (0.2 moles) of diethylcarbamoyl chloride. The mass was heated to 70°–75°C for 2 hours and then treated as in Example 2. Thereby were obtained 52 g of an oily liquid consisting for 96% of S(p-chlorobenzyl)N,N-diethyl-thiol-carbamate, corresponding to a reaction yield of 97% in 100% product.

EXAMPLE 7

To a mixture of 9 g (0.145 moles) of ethylmercaptan, 1 g of Zn powder and 50 cc of benzene, were admixed, under stirring at 35°–40°C, 16.1 g (0.1 mole) of hexamethyleneiminocarbamoyl chloride. This mass was then heated for 2 hours at 50°C and, operating as in Example 2, there were obtained 17.5 g of an oily liquid consisting of 96% of S-ethyl-N-hexamethylene-iminothiol-carbamate, corresponding to a reaction yield of 90% in 100% product.

EXAMPLE 8

To a mixture of 10.6 g of benzylmercaptan (0.11 mole), 1 g of Zn powder and 50 cc benzene, were admixed, under stirring at 50°–55°C, 21 g (0.11 mole) of N,N-di-n-butyl-carbamoyl chloride. This mixture was then heated for 2 hours at 55°–60°C. By operating as in Example 2, there were obtained 30.5 g of S-benzyl-N,N-di-n-butyl-thiol-carbamate at 95.2%, corresponding to a reaction yield of 94.5% in 100% product.

EXAMPLE 9

To a mixture of 24.8 g (0.2 mole) of benzylmercaptan, 2 g of Zn powder and 100 cc of benzene, were admixed under stirring at 50°–55°C, 32.6 g (0.2 mole) of N,N-di-isopropylcarbamoyl chloride.

Operating according to Example 2, there were obtained 49 g of a solid substance containing 95.3% of S-benzyl-N,N-di-isopropyl-thiolcarbamate, corresponding to a reaction yield of 93.4% in 100% product.

EXAMPLE 10

To a mixture of 26 g of ethylmercaptan (0.42 mole), 1 g of Zn powder and 100 cc benzene, were admixed, under stirring at 55°–60°C, 32 g (0.2 mole) of diallylcarbamoyl chloride. By operating as in Example 2, there were obtained 35.5 g of an oily liquid consisting for 95% of S-ethyl-N,N-diallyl-thiol-carbamate, corresponding to a reaction yield of 91,5% in 100% product.

In U.S. Pat. No. 2,983,747, in Example 7, there is described the preparation of S-ethyl-N,N-diallyl-thiol-carbamate, carried out as described hereinabove, except that the catalyst used was $ZnCl_2$ and not Zn. There was obtained a product of undisclosed titer in a reaction yield of 65%.

What we claim is:

1. A process for preparing esters of thiol-carbamic acids according to the reaction:

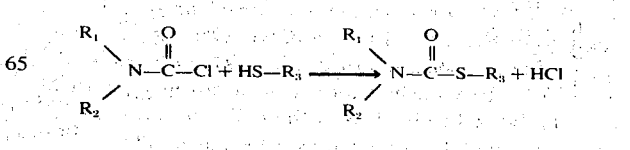

wherein $R_1$ and $R_2$, which may be the same or different, are selected from the group consisting of linear, branched and cyclic saturated and unsaturated aliphatic radicals having from 1 to 9 carbon atoms and aromatic radicals or are joined to each other to form with Na cyclopolymethylenic ring; $R_3$ is selected from the group consisting of linear, branched and cyclic aliphatic radicals having from 1 to 9 carbon atoms and aromatic radicals, said process being characterized in that the reaction is carried out in the presence of a catalyst which is selected from the group of metals consisting of Zn, Sn and Fe or is the DeVarda metal alloy.

2. The process according to claim 1, in which N,N-disecbutylcarbamoyl chloride is reacted with benzylmercaptan in the presence of Zn powder as catalyst and at a temperature comprised between 20° and 120°C.

3. The process according to claim 1, in which N,N-disecbutylcarbamoyl chloride is reacted with benzylmercaptan in the presence of Sn powder as catalyst and at a temperature comprised between 20° and 120°C.

4. The process according to claim 1, in which N,N-disecbutylcarbamoyl chloride is reacted with benzylmercaptan in the presence of Fe powder as catalyst and at a temperature comprised between 20° and 120°C.

5. The process according to claim 1, in which N,N-disecbutylcarbamoyl chloride is reacted with benzylmercaptan in the presence of the DeVarda alloy powder as catalyst and at a temperature comprised between 20° and 120°C.

6. The process according to claim 1, characterized in that the mercaptan contains disulphide and the ester obtained has a titer of 95% or higher and is obtained in practically quantitative yield without special purification of the crude reaction product.

* * * * *